(12) United States Patent
Roberts et al.

(10) Patent No.: US 9,452,464 B2
(45) Date of Patent: Sep. 27, 2016

(54) METHOD OF FORMING A TUBULAR MEMBER

(75) Inventors: Kyle T. Roberts, Hickory, NC (US); Preston M. Eason, Mason, TN (US)

(73) Assignee: Federal-Mogul Corporation, Southfield, MI (US)

( * ) Notice: Subject to any disclaimer, the term of this patent is extended or adjusted under 35 U.S.C. 154(b) by 1042 days.

(21) Appl. No.: 13/176,835

(22) Filed: Jul. 6, 2011

(65) Prior Publication Data
US 2013/0008218 A1    Jan. 10, 2013

(51) Int. Cl.
*B21D 53/16* (2006.01)
*B21D 5/00* (2006.01)
*B21D 5/12* (2006.01)
*G01B 5/06* (2006.01)
(Continued)

(52) U.S. Cl.
CPC ............... *B21D 53/16* (2013.01); *B21D 5/004* (2013.01); *B21D 5/12* (2013.01); *B23K 26/282* (2015.10); *B23K 31/00* (2013.01); *B23K 31/027* (2013.01); *G01B 5/068* (2013.01); *B23K 2203/04* (2013.01)

(58) Field of Classification Search
CPC .......... B21D 53/16; B21D 5/00; B21D 5/12; B21D 5/004; G01B 5/06; G01B 5/068; B21K 1/76; B23K 31/027; B23K 31/00; B23K 26/285; B23K 2203/04
USPC ......... 72/129, 130, 132, 135, 146, 166, 168, 72/169, 203, 367.1, 368, 370.06, 370.1, 72/370.11, 131, 329, 330, 335, 336, 337; 83/863, 872, 870, 875, 876, 877, 879, 83/884, 885, 886, 55, 425, 425.1, 425.2, 83/425.3

See application file for complete search history.

(56) References Cited

U.S. PATENT DOCUMENTS 735,936 A * 8/1903 Blakey .......................... 72/129
1,043,832 A   11/1912 Herr
(Continued)

FOREIGN PATENT DOCUMENTS

EP      1184098 A2    3/2002
GB      2151515 A     7/1985
(Continued)

OTHER PUBLICATIONS

International Search Report PCT/US2012/045351 mailed Nov. 2, 2012.
(Continued)

*Primary Examiner* — Shelley Self
*Assistant Examiner* — Gregory Swiatocha
(74) *Attorney, Agent, or Firm* — Robert L. Stearns; Dickinson Wright, PLLC

(57) ABSTRACT

A method for roll-forming a tubular member is provided. The method includes providing a roll-forming machine having a pair of rollers and a forming roller adjacent the pair of rollers. Further, cutting a strip of sheet metal to form a segment having free leading and trailing ends extending between a predetermined length; feeding the segment between the pair rollers; calculating the thickness of the segment via feedback from the pair of rollers; automatically adjusting the position of the forming roller in response to the determined thickness of the segment; advancing the segment between the pair of rollers and against the forming roller to form an annulus; and forming a weld joint between the free ends.

6 Claims, 4 Drawing Sheets

(51) Int. Cl.
*B23K 31/00* (2006.01)
*B23K 31/02* (2006.01)
*B23K 26/282* (2014.01)
*B23K 103/04* (2006.01)

(56) References Cited

U.S. PATENT DOCUMENTS

| | | | |
|---|---|---|---|
| 1,507,838 A | | 9/1924 | Krump |
| 2,854,743 A | | 10/1958 | Gollwitzer |
| 3,129,496 A | | 4/1964 | Cox |
| 3,129,505 A | | 4/1964 | Cox |
| 3,729,124 A | | 4/1973 | Kedzior et al. |
| 3,738,149 A | * | 6/1973 | Archer .............. 72/171 |
| 3,845,645 A | * | 11/1974 | Gebauer ............ 72/11.6 |
| 3,934,324 A | | 1/1976 | Hess et al. |
| 4,058,997 A | * | 11/1977 | Siegwart ............ 72/50 |
| 4,082,935 A | | 4/1978 | Lampietti et al. |
| 4,249,406 A | * | 2/1981 | Anderson ........... 72/52 |
| 4,304,114 A | | 12/1981 | Wiig |
| 4,508,255 A | | 4/1985 | Lorenz et al. |
| 4,549,422 A | | 10/1985 | Harrow |
| 4,616,495 A | * | 10/1986 | Menzel ............. 72/49 |
| 4,634,038 A | | 1/1987 | Luigi |
| 4,706,488 A | * | 11/1987 | Williamson ........ 72/96 |
| 4,726,210 A | * | 2/1988 | Weil et al. ........ 72/133 |
| 4,741,468 A | | 5/1988 | Weil et al. |
| 4,796,449 A | * | 1/1989 | Berne .............. 72/8.3 |
| 5,187,959 A | * | 2/1993 | Davi ............... B21D 5/14 72/10.6 |
| 5,341,665 A | | 8/1994 | Christophel et al. |
| 5,497,935 A | | 3/1996 | Gravier |
| 5,609,055 A | * | 3/1997 | Castricum ......... 72/49 |
| 5,953,946 A | | 9/1999 | Mucke et al. |
| 6,216,511 B1 | | 4/2001 | Ohnishi et al. |
| 6,339,946 B1 | | 1/2002 | Yamashita et al. |
| 6,367,684 B1 | | 4/2002 | Hoffmann et al. |
| 6,467,510 B2 | | 10/2002 | Yamashita et al. |
| 6,588,648 B1 | | 7/2003 | Gysi |
| 6,769,597 B1 | | 8/2004 | Seizu |
| 6,990,841 B2 | | 1/2006 | Desousa et al. |
| 7,124,609 B1 | * | 10/2006 | Hermanson ........ 72/82 |
| 7,131,305 B2 | | 11/2006 | Desousa et al. |
| 7,213,431 B1 | | 5/2007 | Hsu |
| 7,318,279 B2 | | 1/2008 | Mitsuyoshi et al. |
| 2004/0187537 A1 | * | 9/2004 | Kudo ............... 72/168 |
| 2009/0126443 A1 | | 5/2009 | Tachi |

FOREIGN PATENT DOCUMENTS

| | | | |
|---|---|---|---|
| JP | 57075297 | | 5/1982 |
| JP | 59223116 | | 12/1984 |
| JP | 62009734 A | | 1/1987 |
| JP | 1138021 A | | 5/1989 |
| JP | 7185671 A | | 7/1995 |
| JP | 7314050 A | | 12/1995 |
| JP | 2003001329 A | * | 1/2003 |

OTHER PUBLICATIONS

European Search Report mailed Jun. 15, 2015 (EP12737964).

* cited by examiner

METHOD OF FORMING A TUBULAR MEMBER

BACKGROUND OF THE INVENTION

1. Technical Field

This invention relates generally to methods of forming tubular members, and more particularly to methods of rolling and welding tubular members.

2. Related Art

It is well known to form metal tubular members from flat sheet material by rolling a fixed length of the sheet material into a tubular form and then welding abutting ends of the rolled sheet to one another to formed a length-wise extending welded seam. However, in forming rolled tubular members, challenges remain in being able to form the tubular member having tightly controlled inner or outer diameter tolerances. Further, challenges remain in being able to form the tubular member having a purely cylindrical shape. Typically, a flat surface is formed immediately adjacent the welded seam, resulting from a small segment of the flat sheet material not being curled. Further yet, challenges remain in forming tightly controlled diameter tolerances due to inherent variation in the actual sheet material thickness due to thickness tolerances of the sheet material. Accordingly, the inner and/or outer diameter of formed with one sheet material thickness is generally different from the inner and/or outer diameter of another sheet material thickness. When these tolerances are critical to the performance of the tubular member and components associate therewith, the useful life of the tubular member and/or components can be reduced.

A method of forming a tubular member from a generally flat piece of metal sheet material in accordance with invention overcomes the challenges discussed above, as well as others, which will be readily apparent to those possessing ordinary skill in the art of forming tubular members from metal sheet material.

SUMMARY OF THE INVENTION

In accordance with one aspect of the invention, a method for roll-forming a tubular member is provided. The method includes providing a roll-forming machine having a pair of rollers and a forming roller adjacent the pair of rollers. Further, cutting a strip of sheet metal to form a segment having free leading and trailing ends extending between a predetermined length; feeding the segment between the pair rollers; calculating the thickness of the segment via feedback from the pair of rollers; automatically adjusting the position of the forming roller in response to the determined thickness of the segment; advancing the segment between the pair of rollers and against the forming roller to form an annulus; and forming a weld joint between the free ends.

In accordance with another aspect of the invention, the method further includes blanking the sheet metal and forming the leading end of the segment having a predetermined radius of curvature corresponding to the radius of curvature of the annulus.

In accordance with another aspect of the invention, the method further includes moving the forming roller to compensate for the thickness of the segment to provide the annulus with at least one of a predetermined inner diameter and/or outer diameter.

In accordance with another aspect of the invention, a further method for roll-forming a tubular member is provided. The method includes providing a roll-forming machine having a pair of rollers and a forming roller adjacent the pair of rollers. Further, cutting a strip of sheet metal to form a segment having free leading and trailing ends extending between a predetermined length, wherein the cutting is performed by blanking the sheet metal and forming the leading end of the segment having a predetermined radius of curvature. Then, feeding and advancing the segment between the pair of rollers and against the forming roller to form an annulus and forming a weld joint between the free ends.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
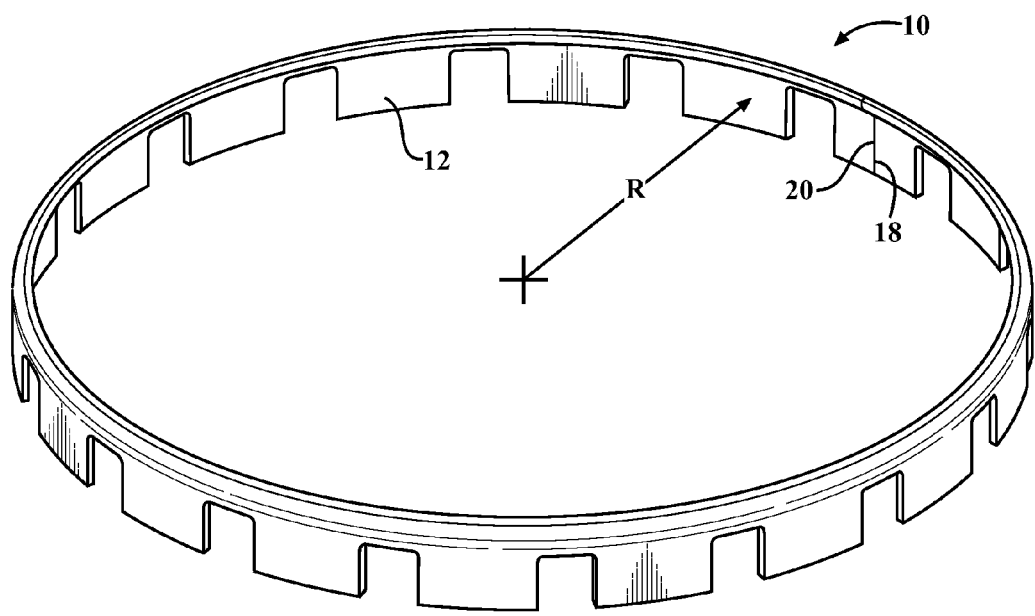
FIG. 1 is a perspective view of a tubular member constructed in accordance with one aspect of the invention.
Figure 2:
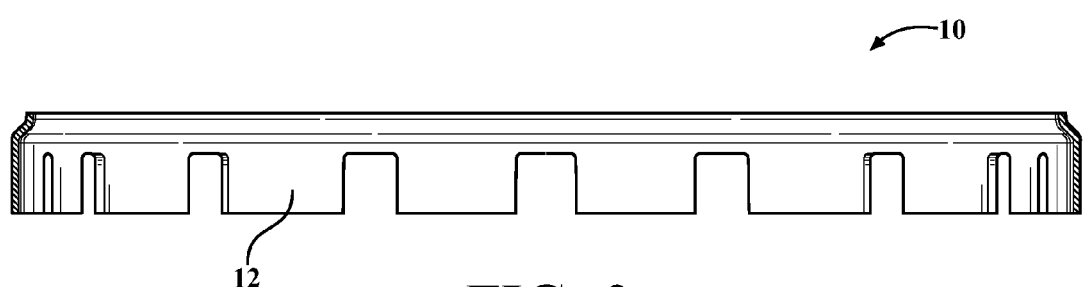
FIG. 2 is a cross-sectional view of the tubular member of FIG. 1.

Referring in more detail to the drawings, FIG. 1 illustrates a tubular member 10, represented as an automatic transmission clutch apply ring, by way of example and without limitation, constructed in accordance with one presently preferred embodiment of the invention. The tubular member, referred to hereafter simply as annulus or ring 10, is constructed from sheet metal strip material 12, such as from steel, which is commonly supplied in coiled form. The steps used to form the ring 10 illustrated in FIGS. 1 and 2, by way of example, are shown in a process flow chart of FIG. 5, which include the following steps: cutting metal sheet material 12 to a predetermined width to form an elongate strip of the material and optionally coiling the sheet material 100, and then, if coiled, uncoiling the cut strip material 12 and straightening the strip material 200. Further, the straightened strip material 12 is processed in a cutting operation 300 to form segments 14 having a predetermined length (l) sufficient to form the ring diameter desired. Then, the cut segments 14 are formed in a rolling operation 400 by a servo-controlled roll-forming machine 16 (FIG. 4) that produces the annular shape of the ring 10. Further, the ring 10 is pushed, such as via a hydraulic cylinder, for example, from the roll forming machine 16 to a welding station 500. Then, the ring 10 is clamped in the welding station 600 whereupon opposite ends 18, 20 of the ring 10 are welded to one another in a welding operation 700, such as via a laser welding operation, by way of example and without limitation. Then, the weld joint is check using feedback from a weld monitoring system 750 to verify that the weld joint meets specification. If the weld joint is flawed, the ring 10 is then sent to scrap 775. However, if the weld joint meets specification, then the ring 10 is ejected from the welding station, such as via a hydraulic cylinder, for example, and transferred to a sizing and flange spin-forming machine 800. Further operations can then optionally be performed, depending on the intended application of the ring 10, such as shown in steps 800-1400. For example, the ring 10 can be ejected from the welding station and transferred to a sizing and flange spin-forming machine 800, such as via a hydraulic cylinder, for example. Then, a sizing process 900 can be performed on the ring 10 to bring the ring to the precise size desired, such as via a hydraulic expanding mandrel. Further, the ring 10 can be further processed via a spin-forming process 1000 to form a flange or flanges on outer edges of the ring 10, such as via a servo-controlled spin device, for example. Then, the ring 10 can be transferred to a piercing process 1100 and then notches and/or openings can be formed in a wall of the ring 10, as desired. The processed ring 10 is then inspected via a suitable ring gauge 1150, whereupon the ring 10 is sent to scrap 1175 if failing inspection, or sent to finished product if passing inspection. Optionally, the ring 10 can be further processed in a plating operation, if desired for the intended application.

The roll-forming machine 16 has a pair of rollers 22, 24 and a forming roller 26 adjacent the pair of rollers 22, 24. In addition, the roll-forming machine 16 has a plurality of rollers 27 separate from the pair of rollers 22, 24 and forming roller 26. The pair of rollers are provided as a feed roller 22 and a pinch roller 24. The feed roller 22 is driven about a fixed axle 28, while the pinch roller 24 rotates about an axle 30 in response to engagement with the advancing strip material 12. The axle 30 supporting the pinch roller 24 is movable toward and away from the feed roller axle 28. In the roll-forming process 400, with the segment 14 of strip material 12 advanced to or slightly beyond a tangent point 32 on the feed roller 22, the pinch roller 24 is moved toward the feed roller 22 into abutment with the strip material 12 to a predetermined pressure. The pressure is determined via an electronic feedback loop, wherein the pressure and the distance of movement of the pinch roller 24 are used to automatically calculate the thickness (t) of the segment 14. Then, prior to forming the ring 10, the forming roller 26 and the plurality of rollers 27 are automatically moved along radially extending slots to a calculated radial position in response the calculated thickness (t) that results in forming the ring with a precise diameter (2×R) desired. As such, any variability of the ring diameter that would otherwise result from thickness tolerances of the strip material are automatically accounted and adjusted for. The segment 14 is then advanced to abut a tangent point 33 on the forming roller 26 and into abutment with the plurality of rollers 27 to form the ring having a predetermined radius of curvature (R), whereupon the ends 18, 20 are welded in the welding process 700, whereupon further processing, e.g., spin forming, sizing, piercing, machining, and plating, for example, are then performed.

Figure 3:
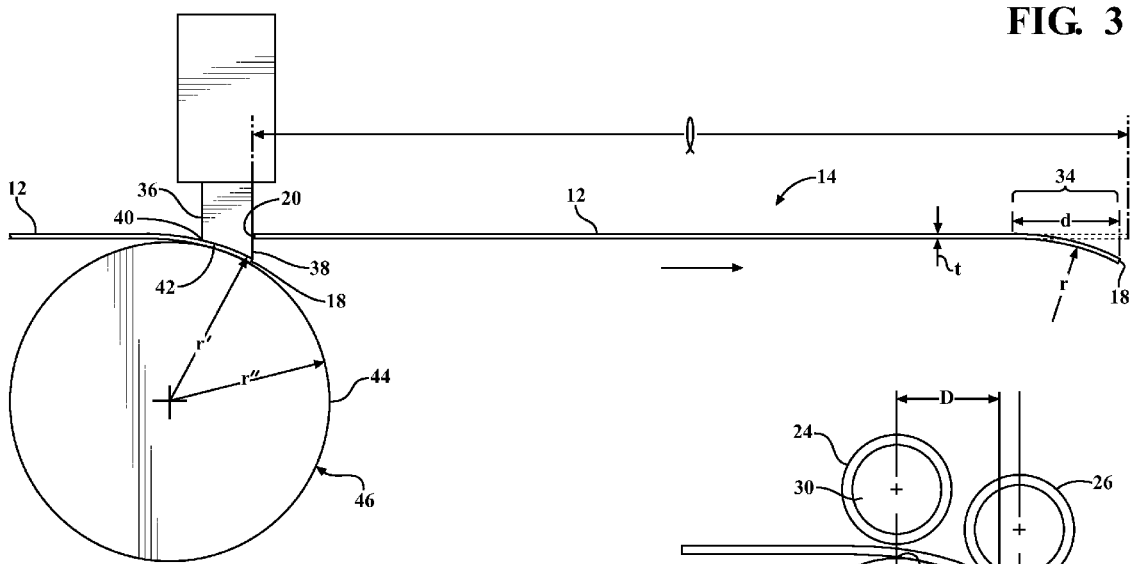
FIG. 3 is a schematic side view of a segment of sheet metal being cut to length.
Figure 4A:
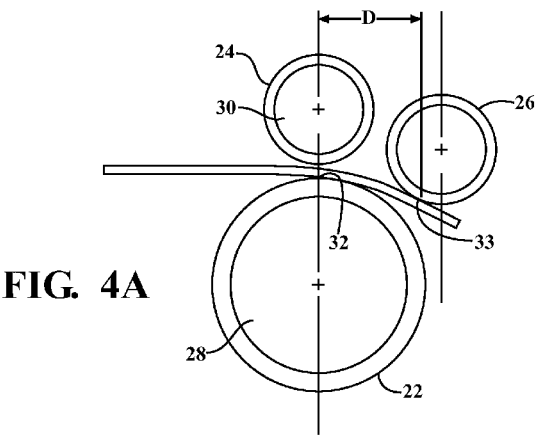
FIG. 4 is a schematic front view of a rolling apparatus constructed in accordance with one aspect of the invention.
Figure 4:
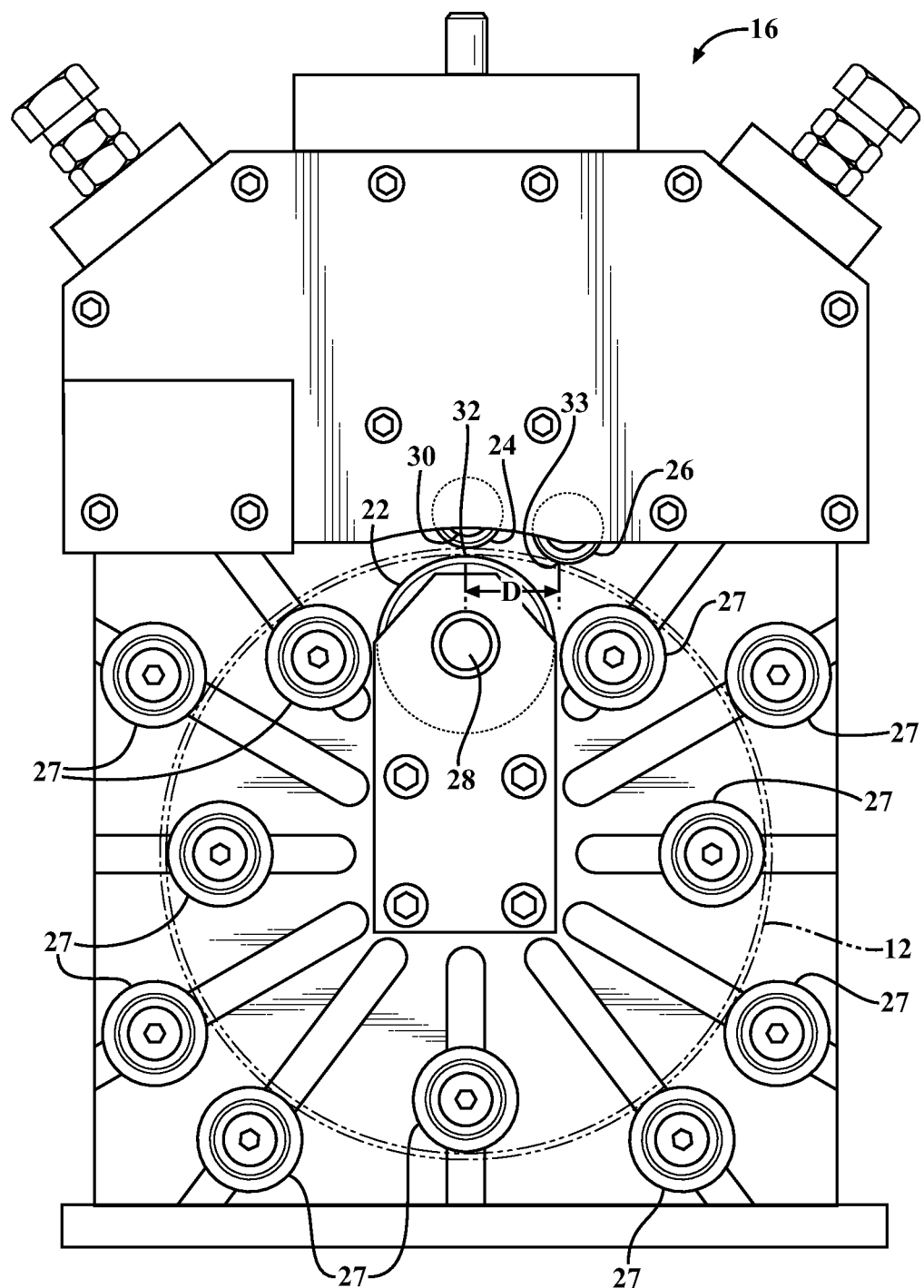

As shown in FIG. 3, to facilitate forming the ring 10 having a purely cylindrical wall, without any flat sections, the cutting operation forms a radiused end portion 34 of the segments 14 with a predetermined radius of curvature (r) via a cutting blade 36. The radiused end portion 34 extends from the free end 18 over a distance (d) equal to or slightly greater than a distance (D) between the tangent points 32, 33 of the feed roller 22 and forming roller 26 (FIGS. 4 and 4A). The predetermined radius of curvature (r) is provided having the same or substantially the same radius of curvature (R) as the annulus 10. As such, the end portion 34, which would tend to remain flat or substantially flat if not pre-curled upon forming the ring 10, takes on a continuously curved radius of curvature r along with the remain portion of the segment 14, thereby providing the ring 10 with a continuous radius of curvature R about its entire circumference.

The cutting blade 36 used in the blanking process has a leading cutting edge 38 and a trailing cutting edge 40, with a radiused surface 42 extending therebetween. The radiused surface 42 has a radius r', which corresponds to (r+t), to produce the radiused end portion 34. To facilitate forming the radiused end portion 34, a mandrel 44 with an outer cylindrical surface 46 with a radius r'', being equal to or substantially equal to r, is used in combination with the cutting blade 36. The mandrel 44 underlies the end portion 34 of the segment 14 during blanking, such that as the cutting blade 36 blanks the strip material 12, the strip material 12 bends around the outer surface 46 of the mandrel 44.

Figure 5:
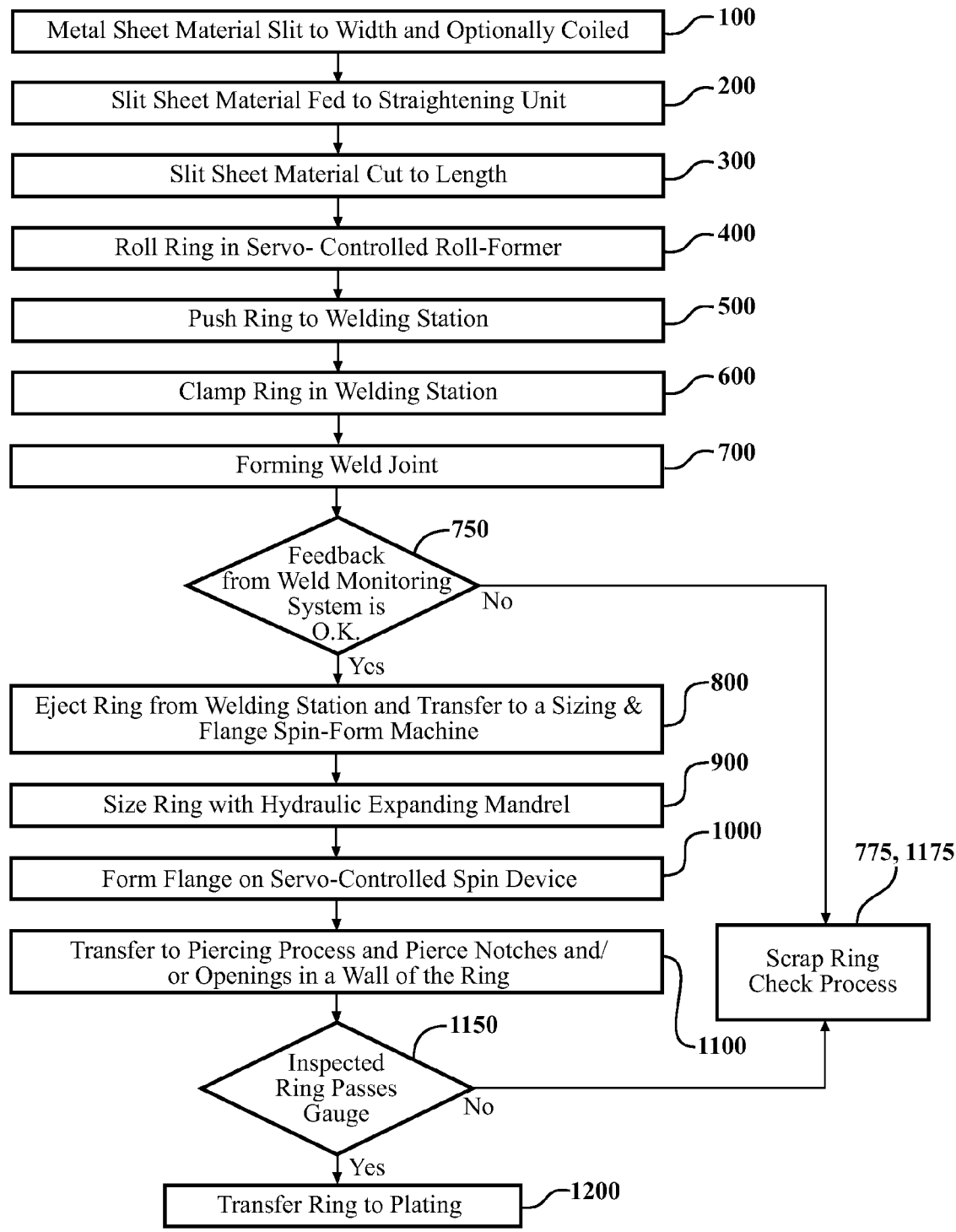
FIG. 5 is a process flow chart of a process for forming a tubular member in accordance with one aspect of the invention.

Upon blanking the segment 14, the segment 14 is further processed as discussed above and as shown in the process flow chart of FIG. 5.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A method for roll-forming a tubular member, comprising:
providing a roll-forming machine having a pair of rollers and a forming roller adjacent the pair of rollers;
cutting a strip of sheet metal having a thickness (t) to form a segment having free leading and trailing ends extending between a predetermined length;
feeding the segment between the pair of rollers;
advancing the segment between the pair of rollers and against the forming roller to form an annulus;
forming a butt weld joint between the free ends; and
performing the cutting by blanking the sheet metal with a cutting blade and forming the leading end of the segment having a predetermined radius of curvature (r), with the cutting blade having a leading cutting edge and a trailing edge, the cutting blade having a radiused surface extending between the leading cutting edge and the trailing edge, wherein the radiused surface of the cutting blade has a radius (r') equaling (r+t).

2. The method of claim 1 further including forming the predetermined radius of curvature having substantially the same radius of curvature as the annulus.

3. The method of claim 1 further including forming the predetermined radius extending over a distance substantially equal to the distance between tangent points of the pair of rollers and forming roller against which the segment abuts.

4. The method of claim 1 further including calculating the thickness of the segment via feedback from the pair of rollers and automatically adjusting the position of the forming roller in response to the determined thickness.

5. The method of claim 4 further including pinching the segment between the pair of rollers to a predetermined pressure.

6. The method of claim 4 further including providing the roll-forming machine having a plurality of rollers separate from the pair of rollers and the forming roller and automatically adjusting the position of the plurality of rollers in response to the determined thickness of the segment.

* * * * *